(12) United States Patent
Tang

(10) Patent No.: US 7,124,233 B2
(45) Date of Patent: Oct. 17, 2006

(54) USB COMPOSITE DEVICE AND METHOD USING HUB LINK LAYER AND UTMI INTERFACE

(75) Inventor: Chung-Wen Tang, Miaoli (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 142 days.

(21) Appl. No.: 10/957,652

(22) Filed: Oct. 5, 2004

(65) Prior Publication Data

US 2005/0086403 A1 Apr. 21, 2005

(30) Foreign Application Priority Data

Oct. 7, 2003 (TW) .............................. 92127790 A

(51) Int. Cl.
*G06F 13/00* (2006.01)
*H04B 3/00* (2006.01)
*G06F 3/00* (2006.01)
(52) U.S. Cl. ...................... 710/313; 710/300; 358/501; 358/505
(58) Field of Classification Search ................ 710/313, 710/105, 106, 315, 300, 63, 72; 375/219, 375/220; 714/15; 370/236, 401, 465, 338; 455/73; 709/249, 250, 253; 358/501, 505
See application file for complete search history.

(56) References Cited

U.S. PATENT DOCUMENTS 6,202,103 B1 * 3/2001 Vonbank et al. .............. 710/15
6,389,029 B1 * 5/2002 McAlear ..................... 370/402
6,697,372 B1 * 2/2004 McAlear ..................... 370/402
6,721,332 B1 * 4/2004 McAlear ..................... 370/466
6,826,154 B1 * 11/2004 Subbiah et al. ............. 370/236
6,862,643 B1 * 3/2005 Wu et al. .................... 710/302
2003/0035473 A1 * 2/2003 Takinosawa ................ 375/224
2003/0041205 A1 * 2/2003 Wu et al. .................... 710/302
2005/0086403 A1 * 4/2005 Tang .......................... 710/104

OTHER PUBLICATIONS

"Universal serial bus enhances virtual instrument-based distributed power monitoring" by Young et al. (abstract only) Publication Date: Dec. 2001.*

* cited by examiner

*Primary Examiner*—Gopal C. Ray
(74) *Attorney, Agent, or Firm*—Bacon & Thomas, PLLC

(57) ABSTRACT

An USB composite device using hub link layer and UTMI interface is disclosed, which connects to a host through an USB cable. The device includes an USB physical layer, a hub link layer and plural functional link layers. The USB physical layer can receive and transmit USB signals. The hub link layer connects to the USB physical layer through an UTMI interface, has plural downlink ports to provide linking, and responds an USB transaction performed by the host. The plural functional link layers connect to the downlink ports of the hub link layer through plural UTMI interfaces.

8 Claims, 3 Drawing Sheets

US 7,124,233 B2

USB COMPOSITE DEVICE AND METHOD USING HUB LINK LAYER AND UTMI INTERFACE

BACKGROUND OF THE INVENTION

1. Field of the Invention

The present invention relates to the technical field of Universal Serial Bus (USB) and, more particularly, to an USB composite device.

2. Description of Related Art

Currently, electronic products are developing toward the tide of high-speed transmission due to quickly improved electronic technologies. However, for a personal computer (PC), the widely used universal serial bus (USB) has developed from USB1.1 to USB2.0. USB2.0 standard can have the transmission speed up to 480 Mbits/s about 40 times faster than 12 Mbits/s of USB1.1 standard. Also, it uses a pair of differential signals USBD+ and USBD− for transmission. Since the transmission speed up to 480 Mbits/s and the action of transmitting and receiving the pair of differential signals USBD+ and USBD− use analog techniques, Intel cooperation accordingly defines an USB 2.0 Transceiver Macrocell Interface (UTMI) interface signals for analog-specialized companies to design USB 2.0 Transceiver Macrocell (UTM) while other IC design companies design the remaining functions in USB 2 standard. Thus, specialization is obtained to speed the distribution of USB 2.0 products.

However, when a host 110 with USB 2.0 socket wants to connect plural USB devices, due to the limit of USB socket number, as shown in FIG. 1, the host 110 has to link a hub 120 first and downlink ports 122 and 123 of the hub 120 and then connect to an USB printer 130 and an USB scanner 140. As shown in FIG. 1, such a configuration requires six physical layers. Thus, the conventional skill requires plural physical layers, which increases cost. In addition, in this case, the hub 120 requires three physical layers implemented by analog techniques, and thus its IC yield is affected.

Therefore, it is desirable to provide an improved USB composite device to mitigate and/or obviate the aforementioned problems.

SUMMARY OF THE INVENTION

The object of the invention is to provide an USB composite device and method using hub link layer and UTMI interface, which can overcome the prior problem in which that plural physical layers are required and the IC yield is negatively affected, thereby increasing the yield and reducing the costs.

In accordance with the first aspect of the present invention, there is provided an USB composite device using hub link layer and UTMI interface. The device connects to a host through an USB cable. The device includes an USB physical layer, a hub link layer and plural functional link layers. The USB physical layer can receive and transmit USB signals. The hub link layer connects to the USB physical layer through an UTMI interface, has plural downlink ports to provide linking, and responds an USB transaction performed by the host. The plural functional link layers connect to the ports of the hub link layer through plural UTMI interfaces.

In accordance with the second aspect of the present invention, there is provided a method for enumerating an USB composite device, the composite device having an USB physical layer, a hub link layer and a plural of functional link layers, which connects to a host through an USB cable, The method includes (A) enumerating hub link layer, which the host sends a reset signal to reset the hub link layer, then the host sends an USB enumeration packet to perform the USB enumeration on the hub link layer; (B) inquiring hub link layer status, which the host inquires the hub link layer about its downlink ports' status; (C) resetting and enabling downlink ports, which the host sends a command to the hub link layer to reset the downlink port, then the host sends another command to the hub link layer to enable the downlink port, and (D) enumerating functional link layer, which the host performs the USB enumeration on the corresponding functional link layer through the downlink port.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
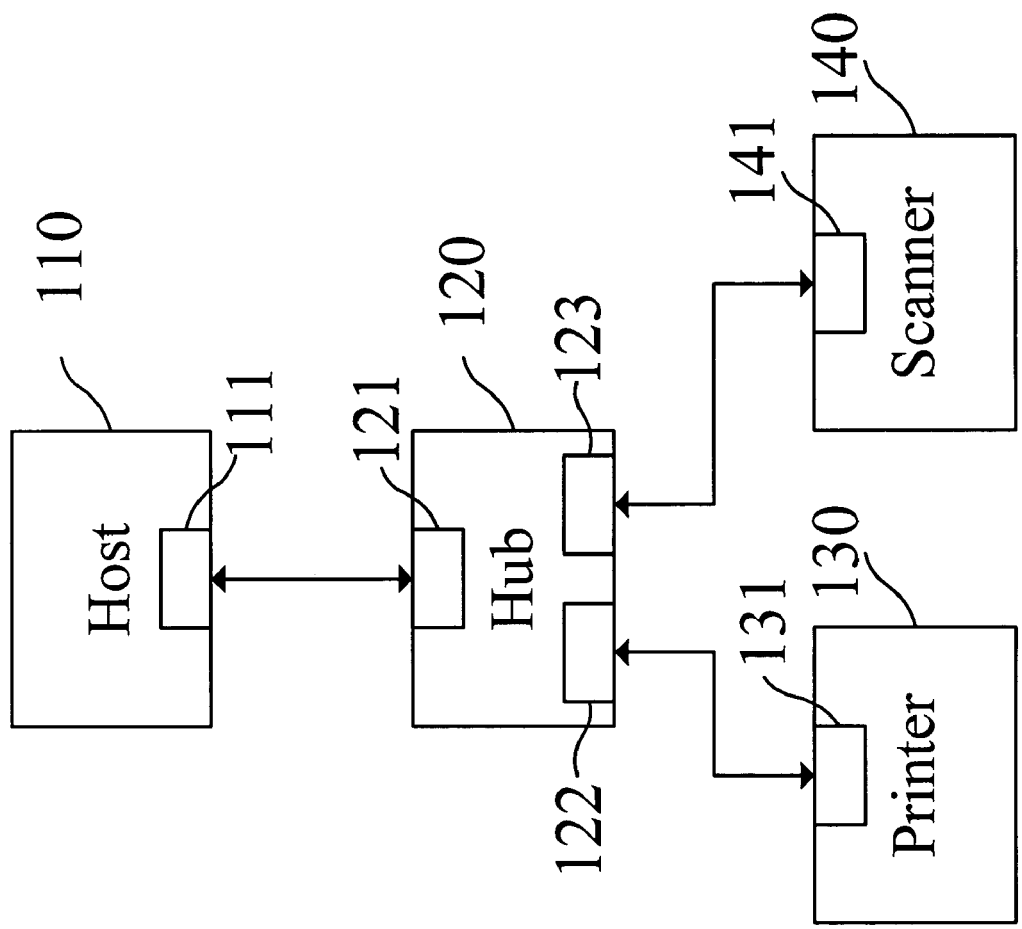
FIG. 1 is a block diagram of a typical personal computer connecting to plural USB devices.
Figure 2:
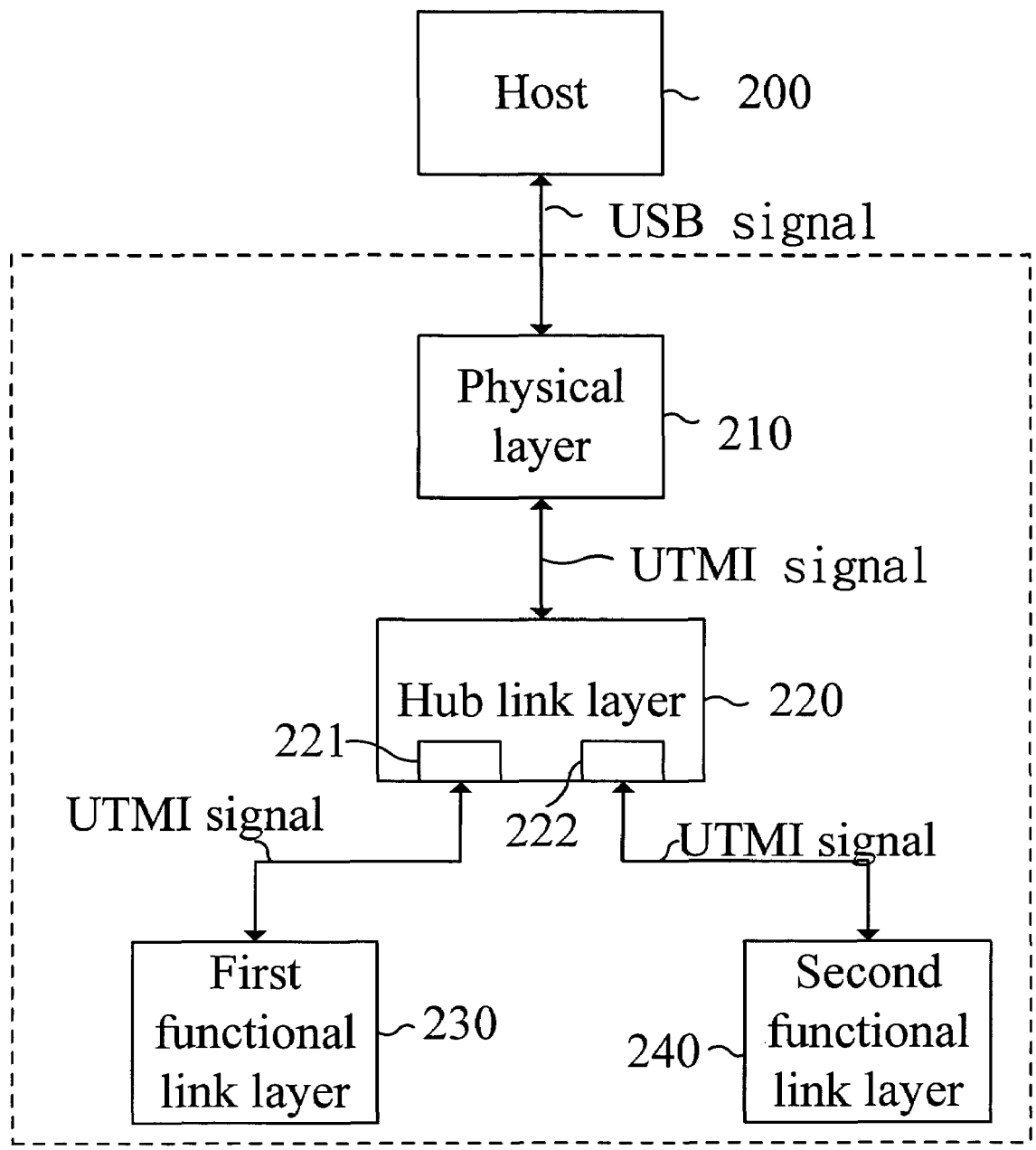
FIG. 2 is a block diagram of an USB composite device using hub link layer and UTMI interface in accordance with the invention.

FIG. 2 is a block diagram of an USB composite device using hub link layer and UTMI interface in accordance with the invention. As shown, the device connects to a host through an USB cable and includes an USB physical layer 210, a hub link layer 220, a first functional link layer 230 and a second functional link layer 240. The first functional link layer 230 is preferred to be a printer link layer and the second functional link layer 240 is preferred to be a scanner link layer 240.

The USB physical layer 210 receives and transmits USB signals USBD+ and USBD−. When the USB physical layer 210 receives signals from an USB bus, the signals USBD+ and USBD− are transformed into an UTMI interface signal. When the USB physical layer 210 transmits signals through the USB bus to the host, the UTMI interface signal is transformed into the signals USBD+ and USBD−.

The hub link layer 220 connects to the USB physical layer 210 through an UTMI interface and responds USB enumeration performed by the host 200. When the USB physical layer 210 and the host 200 are electrically connected through the USB cable, only the hub link layer 220 is enabled, i.e., the first and the second functional link layer 230 and 240 are still disabled. As such, the host 200 sends a reset signal to reset the hub link layer 220. Next, the host 200 sends an USB enumeration packet to perform the USB enumeration on the hub link layer 220.

The hub link layer 220 has downlink ports 221 and 222. The first functional link layer 230 electrically connects to the downlink port 221 through the UTMI interface. The second functional link layer 240 electrically connects to the downlink port 222 through an UTMI interface. In software view, the first functional link layer 230 and the second functional link layer 240 connect to the downlink ports 221 and 222 of the hub link layer 220 with virtual links respectively. Since the downlink ports 221 and 222 are initially disabled, the UTMI interface signals for the ports 221 and 222 are also gated by the hub link layer 220. Accordingly, when the host performs the USB enumeration on the hub link layer 220, the first and the second functional link layers 230 and 240 cannot receive corresponding data, so that the host 200 can normally perform the USB enumeration for the hub link layer 220.

After the USB enumeration is complete, the host 200 inquires the hub link layer 220 about its downlink ports' status and thus detects devices existence in the downlink ports, i.e., the downlink ports respectively connecting to the first and the second functional link layers 230 and 240. As such, the host 200 first sends a command to the hub link layer 220 to reset the downlink port 221. Next, the host 200 sends another command to the hub link layer 220 to enable the downlink port 221 such that the host 200 can perform the USB enumeration on the first functional link layer 230 through the downlink port 221. At this point, the hub link layer 220 performs the USB enumeration completely, and the second functional link layer 240 and respective downlink port 222 are still disabled, so that the host 200 can normally perform the USB enumeration on the first functional link layer 230.

Similarly, since the downlink port 222 connects to the second functional link layer 240, the host 200 first sends a command to the hub link layer 220 to reset the downlink port 222. Next, the host 200 sends another command to the hub link layer 220 to enable the downlink port 222 such that the host 200 can perform the USB enumeration on the second functional link layer 240 through the downlink port 222. At this point, since the USB enumeration is performed completely on the hub link layer 220 and the first functional link layer 230, the host 200 can normally perform the USB enumeration on the second functional link layer 240.

After the USB enumeration is performed completely on the hub link layer 220, the first functional link layer 230 and the second functional link layer 240, the first and the second functional link layers 230 and 240 can receive transaction packets sent by the host 200 through the UTMI interface. If transaction packets is sent to the first functional link layer 230, the first functional link layer 230 subsequently sends a response upwardly through the UTMI interface. Next, the hub link layer 220 does not process the response but sends it to the physical layer 210 to transform the same into the USB signals for being sent to the host 200.

Figure 3:
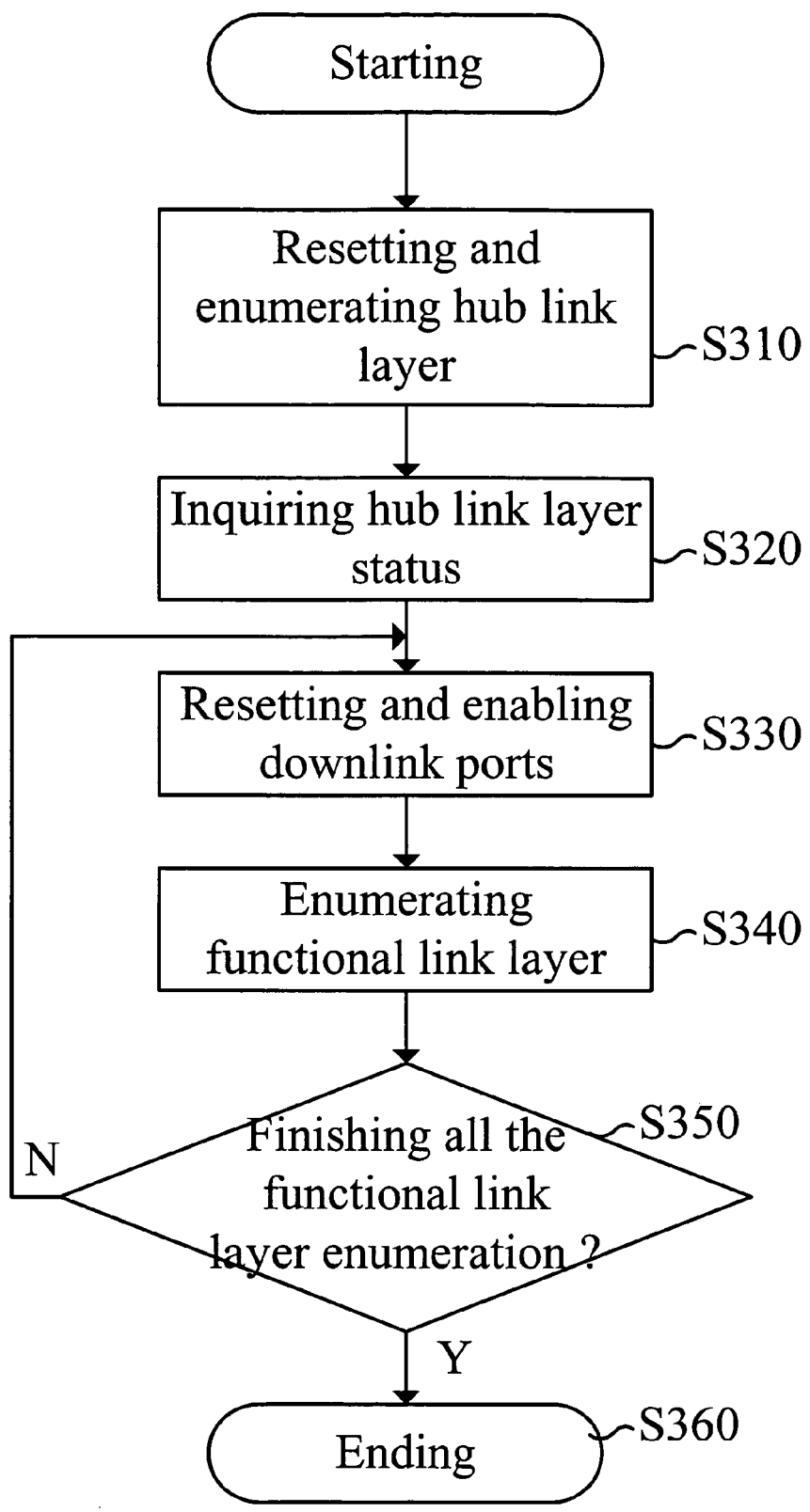
FIG. 3 is a flowchart of an USB composite device using hub link layer and UTMI interface in accordance with the invention.

FIG. 3 is a flowchart of the invention. First, in step S310, it performs a reset and an enumeration of the hub link layer 220. When the USB physical layer 210 and the host 200 are electrically connected through the USB cable, only the hub link layer 220 is enabled, i.e., the first and the second functional link layer 230 and 240 are still disabled. As such, the host 200 sends a reset signal to reset the hub link layer 220. Next, the host 200 sends an USB enumeration packet to perform the USB enumeration on the hub link layer 220.

The hub link layer 220 has downlink ports 221 and 222. The first functional link layer 230 electrically connects to the downlink port 221 through the UTMI interface. The second functional link layer 240 electrically connects to the downlink port 222 through an UTMI interface. Since the downlink ports 221 and 222 are initially disabled, the UTMI interface signals for the ports 221 and 222 are also gated by the hub link layer 220. Accordingly, when the host performs the USB enumeration on the hub link layer 220, the first and the second functional link layers 230 and 240 cannot receive corresponding data, so that the host 200 can normally perform the USB enumeration for the hub link layer 220.

In step S320, it performs an inquiry step, which inquires the hub link layer 220 about its downlink ports' status and thus detects devices existence in the downlink ports, i.e., the downlink ports respectively connecting to the first and the second functional link layers 230 and 240. In step S330, the host 200 first sends a command to the hub link layer 220 to reset the downlink port 221. Next, the host 200 sends another command to the hub link layer 220 to enable the downlink port 221 such that the host 200 can perform the USB enumeration on the first functional link layer 230 through the downlink port 221(step S340). At this point, the hub link layer 220 performs the USB enumeration completely, and the second functional link layer 240 and respective downlink port 222 are still disabled, so that the host 200 can normally perform the USB enumeration on the first functional link layer 230.

In step S350, it is determined by host 200 whether the enumerated functional link layer is the last functional link layer. If yes, the process goes to step S360. Otherwise, the process jumps to step S330 for enumerating next functional link layer.

In view of the foregoing, it is known that the invention has the advantage that one physical layer is installed in the host 200 and the inventive device respectively, instead of using six physical layers in the prior art, and thus the required area for IC is reduced to further reduce costs. In addition, because physical layers are implemented by analog techniques, the invention can have a higher IC yield than the prior art, for fewer physical layers are used in the invention.

Although the present invention has been explained in relation to its preferred embodiment, it is to be understood that many other possible modifications and variations can be made without departing from the spirit and scope of the invention as hereinafter claimed.

What is claimed is:

1. An USB composite device using hub link layer and UTMI interface, which connects to a host through an USB cable, comprising:
    an USB physical layer for receiving and transmitting USB signals;
    a hub link layer for connecting to the USB physical layer through an UTMI interface, has plural downlink ports to provide linking, and responds an USB enumeration performed by the host; and
    plural functional link layers for connecting to the downlink ports through plural UTMI interfaces.

2. The device as claimed in claim 1, wherein the hub link layer is enabled after reset, thereby responding the USB enumeration performed by the host.

3. The device as claimed in claim 1, wherein the hub link layer is enabled after reset and the plural downlink ports are disable, thereby responding the USB enumeration performed by the host.

4. The device as claimed in claim 3, wherein after the USB enumeration is performed completely on the hub link layer, the plural functional link layers logically connecting to the downlink ports with virtual link are enabled sequentially, thereby respectively responding the USB enumeration performed by the host.

5. The device as claimed in claim 3, wherein the plural functional link layers mutually exclude each other and only one link layer can work in a time.

6. The device as claimed in claim 1, wherein the plural functional link layers connect to the downlink ports of the hub link layer with virtual links respectively.

7. The device as claimed in claim 1, wherein the functional link layers are printer link layers.

8. The device as claimed in claim 1, wherein the functional link layers are scanner link layers.

* * * * *